United States Patent [19]
Diemunsch

[11] Patent Number: 6,088,223
[45] Date of Patent: Jul. 11, 2000

[54] ELECTRONIC APPARATUS WITH IMPROVED HEATSINK ARRANGEMENT

[75] Inventor: Guy Diemunsch, Saint Egrève, France

[73] Assignee: Hewlett-Packard Company, Palo Alto, Calif.

[21] Appl. No.: 09/156,218

[22] Filed: Sep. 18, 1998

[51] Int. Cl.$^7$ .................................................. H05H 7/20
[52] U.S. Cl. ...................... 361/690; 62/259.2; 174/15.2; 361/700
[58] Field of Search .......................... 62/259.2; 165/80.3, 165/140.33; 174/15.2; 257/712–713; 361/687–697, 700, 752

[56] References Cited

U.S. PATENT DOCUMENTS

| | | | |
|---|---|---|---|
| 3,462,553 | 8/1969 | Spranger | 361/690 |
| 4,717,216 | 1/1988 | Hornalt | 361/690 |
| 5,243,218 | 9/1993 | Zenitani et al. | 257/712 |
| 5,339,214 | 8/1994 | Nelson . | |

FOREIGN PATENT DOCUMENTS

0702287A2  9/1995  European Pat. Off. .

WO97/29419  1/1997  WIPO .

*Primary Examiner*—Gregory Thompson

[57] ABSTRACT

Electronic apparatus comprises an electronic component which in use generates heat and a heatsink mounted within a housing having a thermal path to the electronic component. The heatsink comprises formations for generating by natural convection a cooling airflow for dissipating heat from the electronic component. Neighbouring first and second walls of the housing each comprise a vent structure and the formations of the heatsink define one or more oblique paths from the vent structure in the first wall across the heatsink to the vent structure in the second wall so that in at least a first operating orientation the cooling airflow generated by the heatsink passes from the vent structure in the first wall across the heatsink to the vent structure of the second wall and in at least a second operating orientation the cooling airflow generated by the heatsink passes from the vent structure in the second wall across the heatsink to the vent structure of the first wall. The invention finds particular, though not exclusive, application to personal computers which may be operated in either a desktop or tower configuration.

8 Claims, 6 Drawing Sheets

ELECTRONIC APPARATUS WITH IMPROVED HEATSINK ARRANGEMENT

FIELD OF THE INVENTION

This invention relates to the cooling of electronic apparatus and, more particularly, to electronic apparatus having a heatsink arrangement which is effective in more than one operating orientation. The invention finds particular, though not necessarily exclusive, application to personal computers which may be operated in either a desktop or tower configuration.

BACKGROUND OF THE INVENTION

The processors and other components of modem personal computers generate significant amounts of heat in operation and therefore require cooling. Generally, a fan is provided in the computer housing which provides a forced air flow within the housing. Individual components, such as the processor chip itself, which generate significant amounts of heat can be provided with heatsinks for dissipating heat generated by the component. Sometimes, the processor chip itself is cooled by the use of a fan heatsink, in which a fan is mounted on a heatsink on the processor package to blow air across the heatsink.

Whilst the use of a forced air flow can provide effective cooling and has the advantage that it can allow the computer to operate in more than one orientation, the fan necessarily generates undesirable noise. The noise generated is directly related to the speed of the fan and consequently to the degree of cooling provided by the forced air flow. Furthermore, the reliability of the fan may be reduced with higher fan speeds. For the above reasons, in the design of such systems it is desirable to try to reduce the speed of the fan or eliminate the use of a forced air flow entirely.

In another known cooling arrangement used in various types of electronic apparatus, at least part of the excess heat is transferred from within a housing to a heat sink mounted on the exterior of the housing which generates a cooling airflow by convection. For safety or aesthetic reasons such an external heatsink would normally be mounted to the rear of the housing, at least in products destined for use in offices or homes.

One problem with this arrangement is that such convective heatsinks usually comprise a set of parallel fins and will only operate effectively with the fins vertical. Such a finned heatsink mounted to the rear of a typical personal computer system unit would not allow the unit to operate correctly both in a desktop orientation and in a tower orientation, the two most common operating configurations for personal computers. It will be understood that in general, in a desktop configuration a computer system unit housing is wider than it is tall, so that a computer display may be placed on top of the housing. In a tower configuration, a computer system unit housing is taller than it is wide so that it may conveniently be placed on the floor beside a desk, the associated display being placed on the desk separate from the system unit.

The object of this invention is to provide an improved cooling arrangement for a personal computer and which, in particular, allows the computer to be operated in more than one operating orientation.

SUMMARY OF THE INVENTION

In brief, this object is achieved by electronic apparatus comprising an electronic component which in use generates heat and a heatsink mounted within a housing having a thermal path to the electronic component. The heatsink comprises formations for generating by natural convection a cooling airflow for dissipating heat from the electronic component. Neighbouring first and second walls of the housing each comprise a vent structure and the formations of the heatsink define one or more oblique paths from the vent structure in the first wall across the heatsink to the vent structure in the second wall so that in at least a first operating orientation the cooling airflow generated by the heatsink passes from the vent structure in the first wall across the heatsink to the vent structure of the second wall and in at least a second operating orientation the cooling airflow generated by the heatsink passes from the vent structure in the second wall across the heatsink to the vent structure of the first wall.

Since the vents in the walls of the housing and the disposition of the heatsink allow the convective airflow generated by the heatsink to pass in more than one direction across the heatsink according to the orientation of the housing, the apparatus may be designed to work equally well in more than one operating orientation. The invention is therefore particularly suitable for a personal computer system unit which may be used in either desktop and tower operating orientations, although the application of the invention to other types of electronic apparatus with a similar requirement is not excluded. Even if, for other reasons, any particular model of personal computer may not actually be usable in both orientations, the invention is still of advantage to computer manufacturers since it allows them to use common components between different models adapted for desktop and tower orientations, thereby reducing manufacturing cost.

Suitably, in this application, the electronic component may be the computer processor chip itself which is a major source of heat.

Preferably, the heatsink comprises a baseplate disposed to as to cut off the corner at which the first and second walls meet so that the cooling airflow generated by the heatsink is separated from the air within the rest of the interior of the housing. This arrangement provides the advantages of an external heatsink but without the potential safety problems and aesthetic drawbacks associated with external heatsinks.

The formations can comprise a plurality of fins that are perpendicular to the first and second walls.

In a preferred embodiment, the heatsink has the form of an elongate triangular prism having a plurality of slots along one edge. In this case, the heatsink can be mounted in the housing so that the edge that is slotted is adjacent and parallel to the corner at which the first and second walls meet. This arrangement is particularly space efficient and is advantageous especially for apparatus destined for home or office use, where it is usually desirable to reduce the overall size of the housing not only for aesthetic reasons and user convenience but also in order to reduce the cost of the housing and other associated elements, such as electromagnetic shielding structures or the like.

In a particularly preferred implementation, the thermal path includes one or more heat pipes.

In practice and in particular in the application of the invention to personal computers, the apparatus may also include a plurality of other electronic components mounted within the housing and a fan mounted on or within the housing for providing a forced airflow to cool said other electronic components. In this case, the above described arrangement has the advantage that the forced airflow does not need to remove heat from the, or those, components which have a heat path to the heatsink. Therefore, the required fan speed and consequently the noise generated by the apparatus, can be lower than would otherwise be the case.

BRIEF DESCRIPTION OF THE DRAWINGS

A personal computer system unit embodying the invention will now be described, by way of non-limiting example, with reference to the accompanying diagrammatic drawings, in which.

BEST MODE OF CARRYING OUT THE INVENTION

Figure 1:
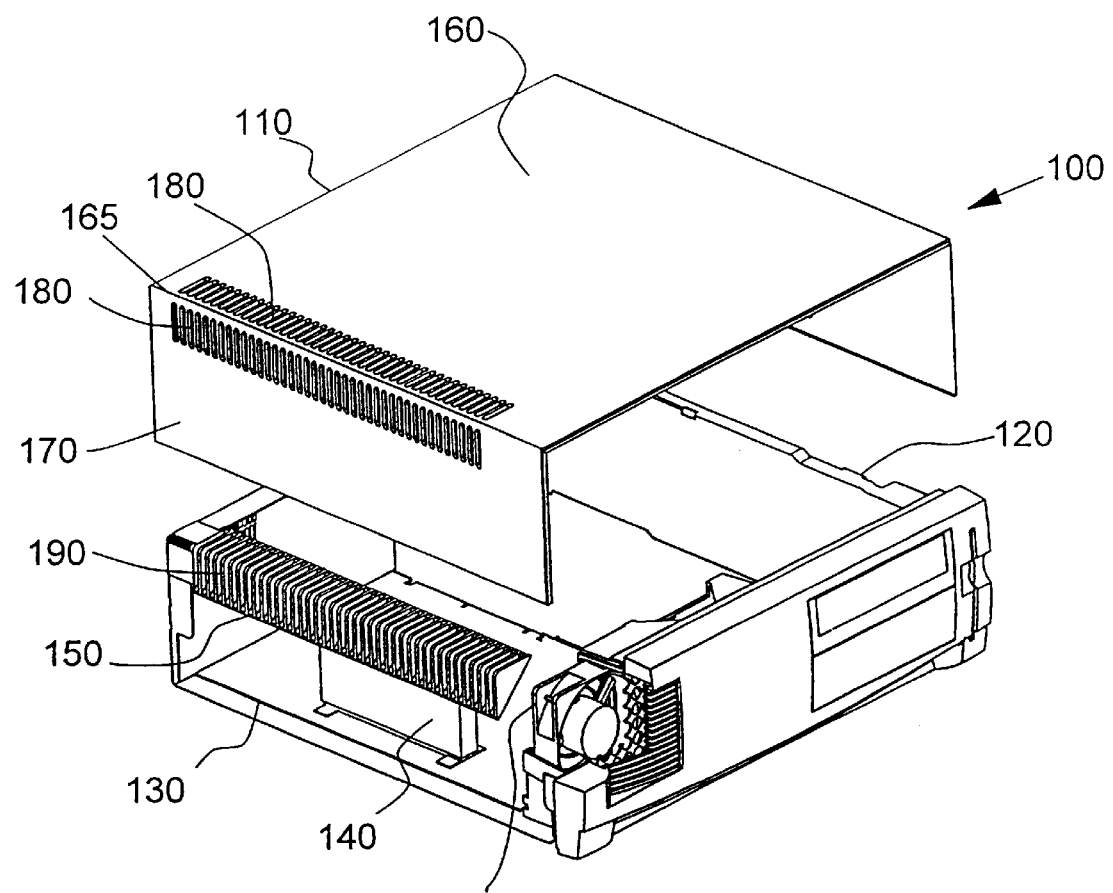
FIG. 1 is an exploded partly cut-away front perspective view of a personal computer system unit.
Figure 2:
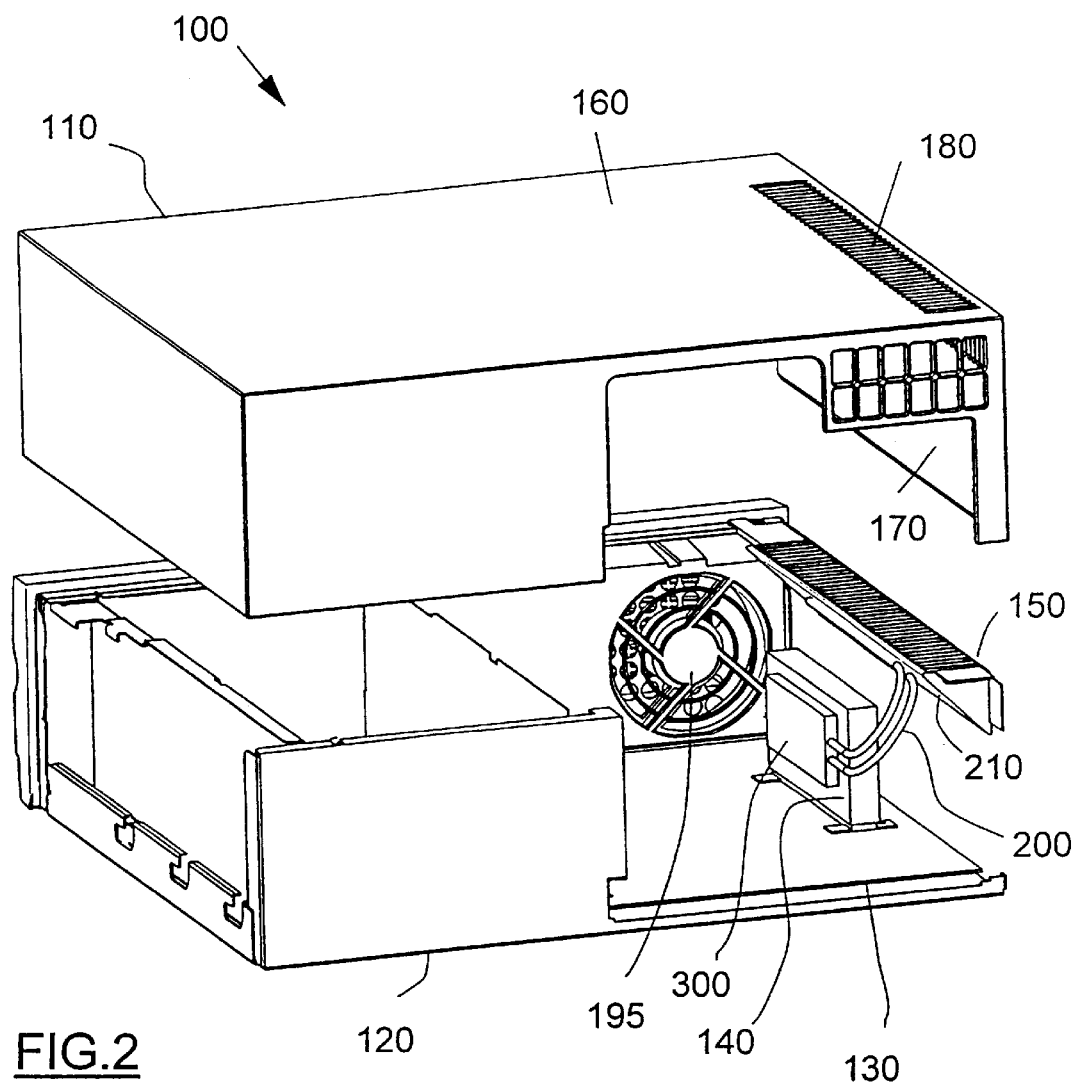
FIG. 2 is an exploded rear perspective view of the personal computer system unit of FIG. 1.

FIGS. 1 and 2 show exploded perspective views of a personal computer system unit 100 from the front and rear respectively. System unit 100 has an improved processor cooling arrangement and which is operable in a number of different operating orientations.

Computer system unit 100 has a generally cuboid housing made up of three-sided cover 110 and chassis unit 120. Cover 110 is removably mounted in an appropriate manner on chassis unit 120. Apart from the cooling arrangements described below, the general configuration and functioning of system unit 100 is conventional and need not be described in detail here. Mounted within the housing on the chassis unit 120 is motherboard 130 upon which is mounted the computer processor package 140. In this embodiment, processor 140 of one of the Pentium (trademark) II family of processors available from Intel Corporation. Such processor packages are orthogonally mounted on the motherboard using an edge connector and can in use generate around 40 watts of thermal power.

As is conventional, many other electronic components (not shown) are also mounted on motherboard 130. In addition, other functional components of the computer which are not directly relevant to an understanding of the present invention, such as hard and floppy disk drives and a power supply, are of course also mounted on chassis unit 120.

Processor package 140 is cooled by corner heatsink 150 which is mounted within the housing on chassis unit 120. Heatsink 150 is made of cast aluminium and is shaped as an elongate triangular prism having a plurality of slots along one edge which form a series of parallel fins 190 upstanding from an obliquely disposed base plate 210. Fins 190 generate a cooling airflow by natural convection.

Figure 3:
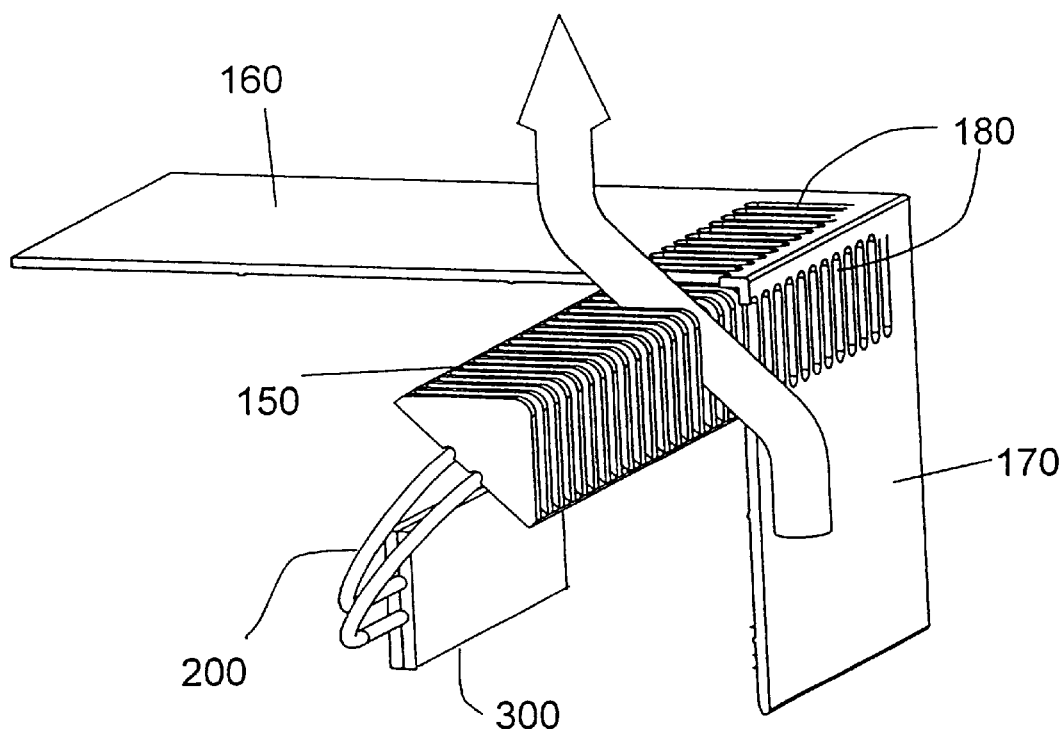
FIG. 3 is a partly cut-away view of the heatsink arrangement in the system unit of FIGS. 1 & 2.

The top surface 160 and side wall 170 of the cover 110 comprise vent structures 180 which are symetrically disposed adjacent corner 165. FIG. 3 is a cutaway view of the top corner of the housing showing the disposition of heatsink 150 in relation to the vents 180 in cover 110. The airflow generated by heatsink 150 to pass either from the vent in side wall 170 across the heatsink to the vent in the top surface 160 as indicated by the arrow in FIG. 3 or in the opposite direction from the vent in the top surface 160 across the heatsink to the vent of side wall 170. The direction of the convective airflow depends on the operating orientation of the computer.

As can be seen in FIG. 3, heatsink 150 is mounted on chassis unit 120 so that the slotted edge is adjacent and parallel to the corner 165 formed by top surface 160 and side wall 170 of cover 110. Baseplate 210 cuts off corner 165 so as to separate the convective airflow generated by fins 190 from the air in the rest of the interior of the housing.

As can be seen in FIGS. 2 and 3, heat pipes 200 provide a thermal path from processor 140 to heatsink 150. A heat pipe is known type of passive device for efficiently transferring heat from a heat source to a heat sink and generally comprises a vacuum-tight elongate vessel which is evacuated and partially filled with a minute amount of water or other working fluid. A wick structure is provided inside the pipe. As heat enters the device at one end, known as the evaporator, the fluid is vaporized creating a pressure gradient in the pipe. This forces the vapor to flow along the pipe to the other end of the pipe, known as the condenser, where it condenses, giving up its latent heat of vaporization. The working fluid is then returned to the evaporator by capillary action in the wick. Heat is thereby transferred from the evaporator to the condenser. A variety of heat pipe products are commercially available from a number of suppliers.

The evaporators of heat pipes 200 are clamped to a mounting block 300 which is in thermal contact with a thermal plate provided on processor package 140. The condensers of heat pipes 200 are in thermal contact with the heatsink 150. In the embodiment described here, two heat pipes are shown connecting processor 140 and heatsink 150. It will be appreciated that the number of heat pipes required depends upon the heat transfer capacity of the heat pipes and other design considerations, such as the flexibility of the pipes.

The computer 100 also includes fan 195 mounted to the front of chassis unit 120. Fan 195 draws air in through openings provided in the front of the chassis (shown in FIG. 1 in a partly cut-away view) to provide a forced airflow within the housing to cool other electronic components mounted on motherboard 130. Due to the triangular form of heatsink 150 and its position in the corner of the housing, the forced airflow generated by fan 195 is separated from the convective airflow generated by heatsink 150 by baseplate 210.

Figure 4:
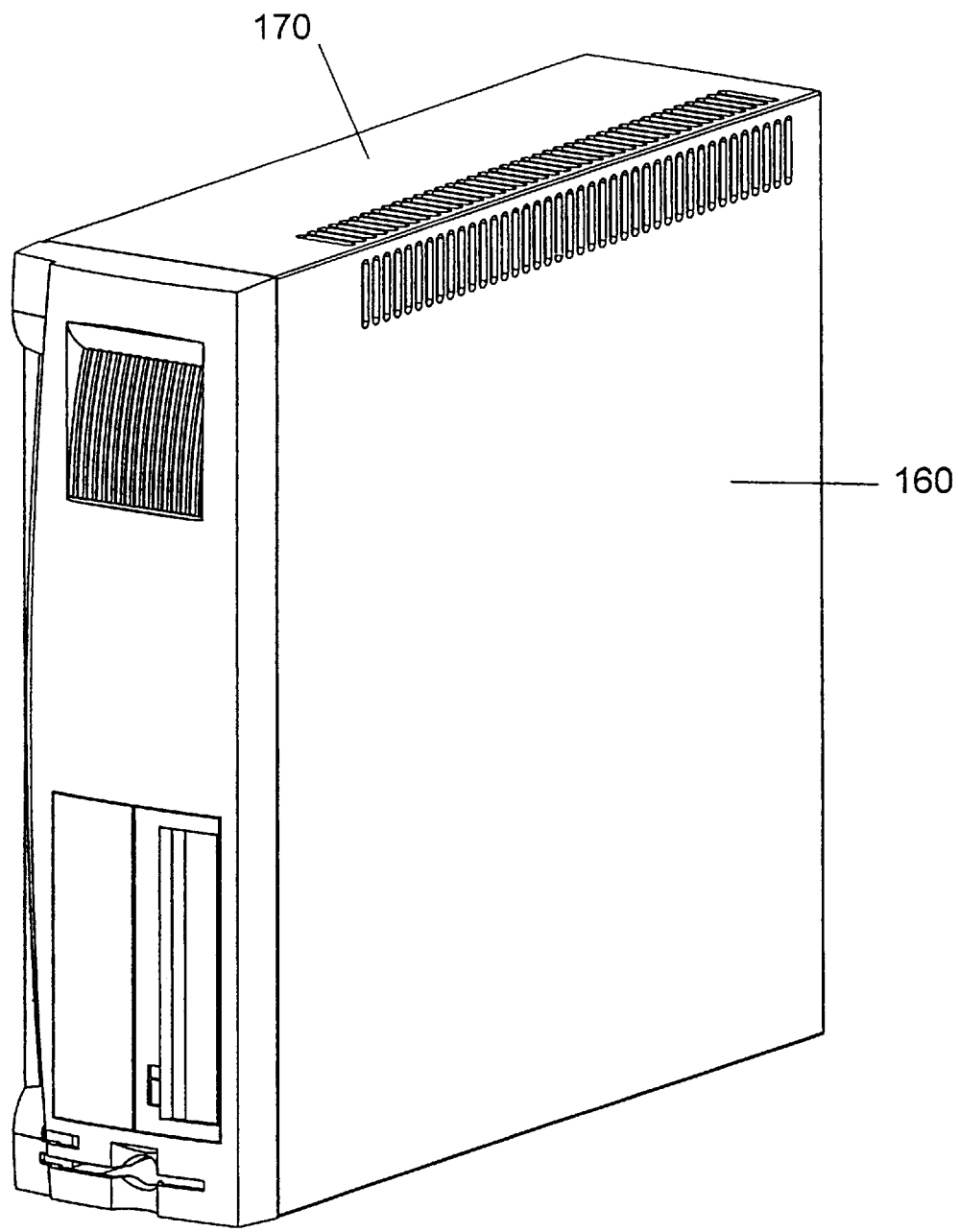
FIGS. 4, 5 & 6 illustrate three different operating positions for the personal computer system unit.
Figure 5:
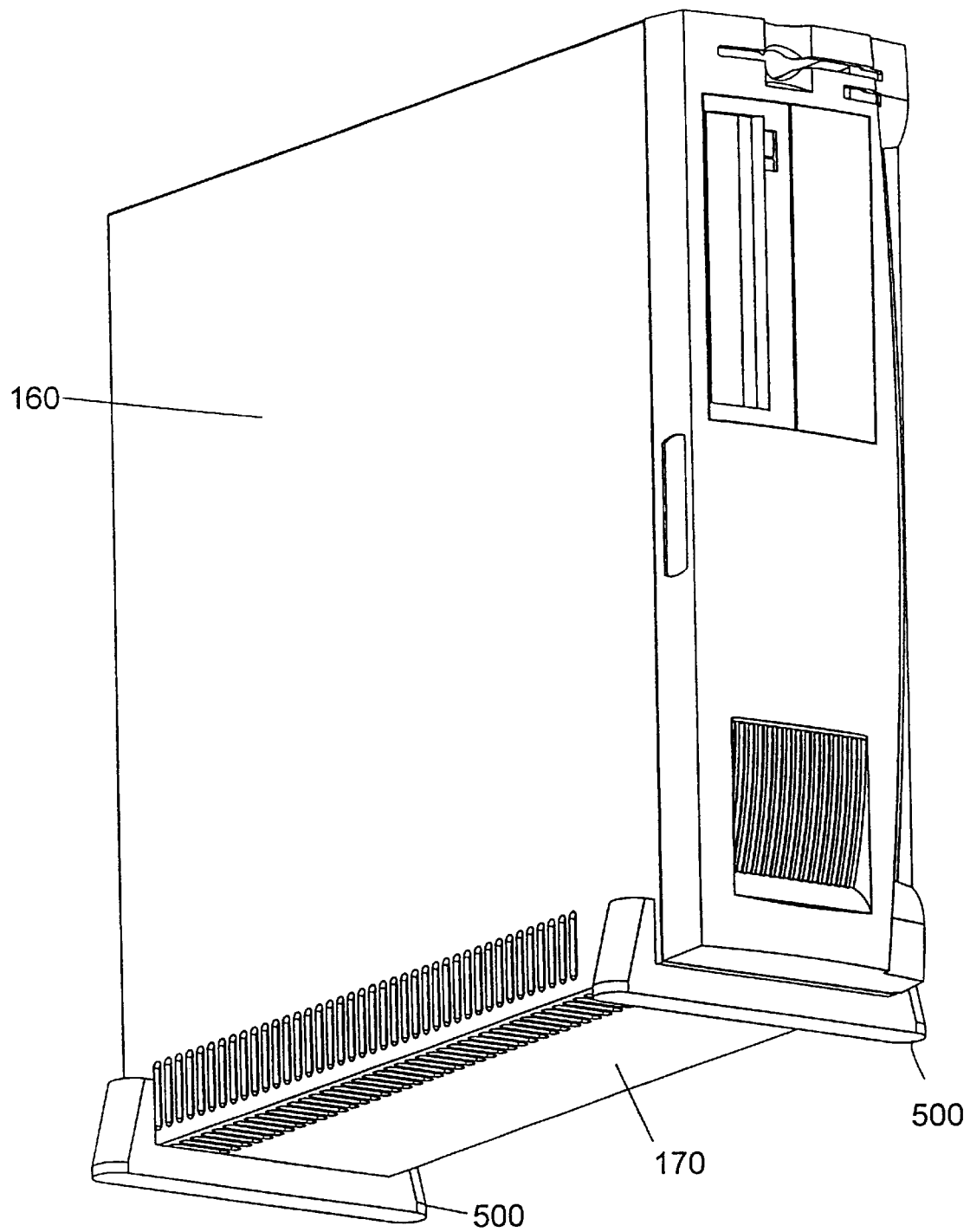
Figure 6:
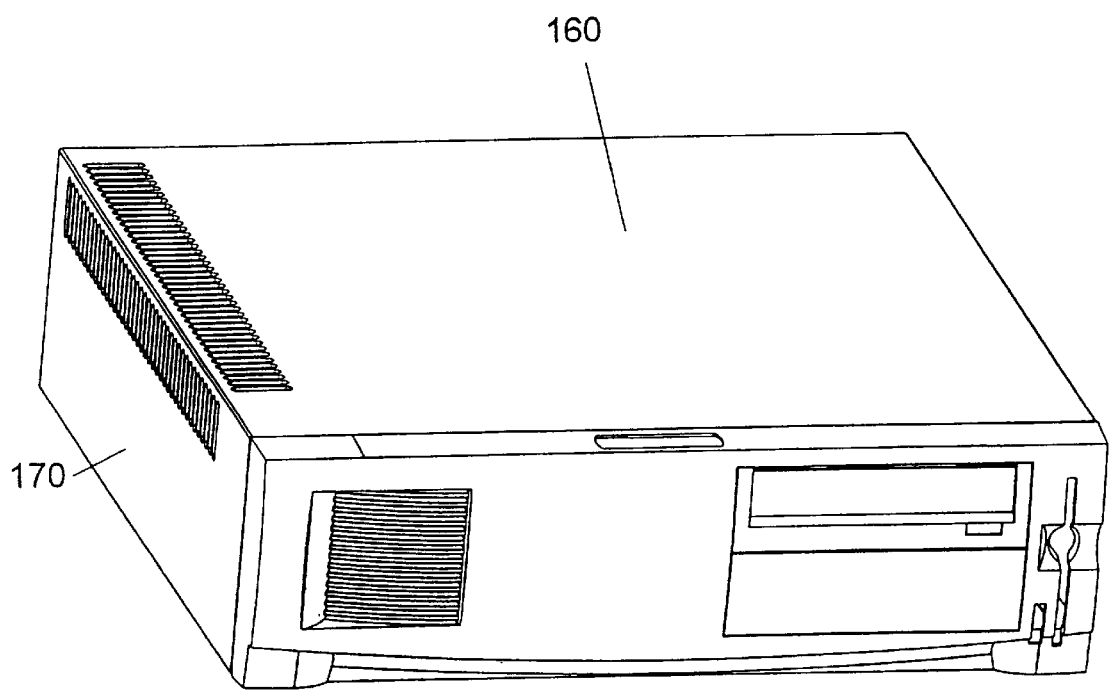

The computer of this embodiment has three possible operating positions as shown in FIGS. 4, 5 and 6. FIG. 4 shows a first tower position in which the corner heatsink is positioned at one of the top corners of the computer. In this case a cooling airflow passes from the openings in surface 160 of cover 110 across the heatsink to the openings of side wall 170 of cover 110. FIG. 5 shows a second tower position in which the corner heatsink is positioned at one of the bottom corners of the computer. In this case the housing is provided with feet 500 which allow an airflow to enter the openings in side wall 170. The airflow then passes across the heatsink and exits through the openings in surface 160.

FIG. 6 shows a desktop position for the computer in which the cooling airflow passes through the openings in side wall 170, across the heatsink and out through the openings in top surface 160.

Although a specific embodiment of the invention has been described, the invention is not to be limited to the specific arrangement so described. The invention is limited only by the claims.

What is claimed is:

1. Electronic apparatus having a housing with at least first and second walls meeting at a corner, said electronic apparatus constructed to be positioned to function in either a first operating position or a second operating position the apparatus comprising:

an electronic component which in use generates heat;

a heatsink mounted within the housing and having a thermal path to the electronic component, the heatsink comprising a formation for generating, by natural convection, a cooling airflow for dissipating heat from the electronic component, said formation comprising a plurality of fins with triangular portions whose edges adjoin said first and second walls that meet at said corner;

wherein the first and second walls of the housing each include a vent structure; and wherein the formations of the heatsink defines one or more oblique paths from the vent structure in the first wall across the heatsink to the vent structure in the second wall so that in at least said first operating orientation where the vent structure in the second wall is higher than the vent structure in the first wall, a cooling airflow passes from vent structure in the first wall across the heatsink to the vent structure of the second wall and in at least said second operating orientation where the vent structure in the first wall is higher than the vent structure in the second wall, a cooling airflow passes from the vent structure in the second wall across the heatsink to the vent structure of the first wall.

2. Electronic apparatus as claimed in claim 1 wherein the heatsink comprises a baseplate disposed so as to cut off the corner at which the first and second walls meet so that the cooling airflow is separated from the air within the rest of the interior of the housing.

3. Electronic apparatus as claimed in claim 2 wherein said formation comprises a plurality of fins that are perpendicular to the first and second walls.

4. Electronic apparatus as claimed in claim 3 wherein the plurality of fins with triangular portions caused said heatsink to have the form of an elongate triangular prism having a plurality of slots formed by the fins along one edge, the heatsink being mounted in the housing so that the edge that is slotted is adjacent and parallel to the corner at which the first and second walls meet.

5. Electronic apparatus as claimed in claim 1 wherein the thermal path comprises one or more heat pipes.

6. Electronic apparatus as claimed in claim 1 wherein the electronic component is a computer processor chip.

7. Electronic apparatus as claimed in claim 1 including a plurality of other electronic components mounted within the housing and a fan mounted on or within the housing for providing a forced airflow to cool said other electronic components.

8. Electronic apparatus as claimed in claim 1, wherein the electronic apparatus is in the form of a personal computer system unit for use in either desktop or tower operating orientations corresponding to said first and second operating portions respectively.

* * * * *